July 2, 1968   J. H. McMEEKIN   3,390,569
FINISH INSPECTION APPARATUS FOR GLASS CONTAINERS
Filed Dec. 5, 1966
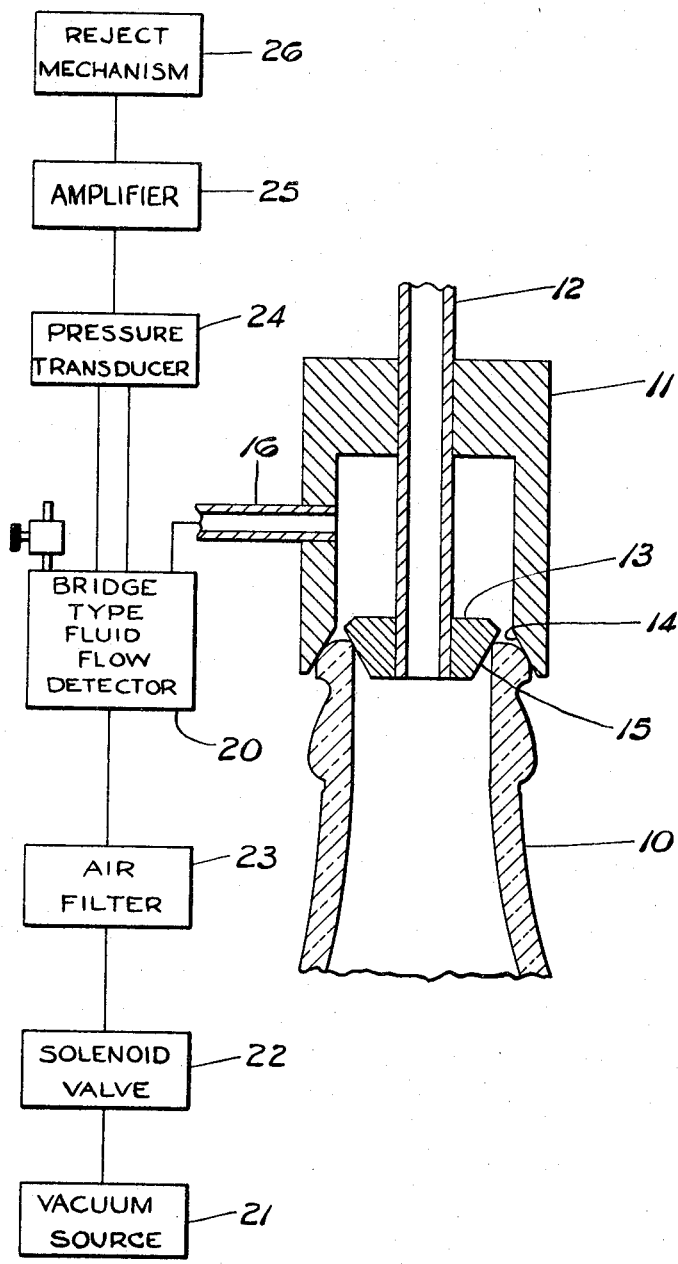
INVENTOR.
JAMES H. McMEEKIN
BY
*Christel & Bean*
ATTORNEYS 3,390,569
FINISH INSPECTION APPARATUS FOR GLASS CONTAINERS
James H. McMeekin, Brockway, Pa., assignor to Brockway Glass Company, Inc., Brockway, Pa.
Filed Dec. 5, 1966, Ser. No. 599,013
3 Claims. (Cl. 73—37)

ABSTRACT OF THE DISCLOSURE

Means for inspecting the top ends of open-mouth glass containers comprising an internal conical member and an external conical member concentric with and within the internal conical member so that the two conical surfaces seat at the outer and inner portions of the container mouth. The internal conical member forms a chamber above the container with the radial space between the two conical members included in said chamber. The internal conical member has a bore therethrough for venting the interior of the container and the chamber has a vacuum connection which detects leakage at either of the container end portions engaged by the internal and external conical members.

---

This invention relates to inspection apparatus for glass containers and particularly to means for detecting defects in the finish portions of such glass containers, that is, the open end portions thereof.

In pending patent application Ser. No. 533,521, filed Mar. 11, 1966, in which I am a co-inventor, there is disclosed apparatus for inspecting the top surfaces of open mouth glass containers for defects of various kinds by applying a vacuum plate or chuck to such upper surface and then evacuating the interior of the container. Leakage between the vacuum plate or chuck and the upper end of the container indicates a defect of one kind or another and results in a lower degree of evacuation of the interior of the container which is translated to a sensible electric impulse by transducer means whereby defective containers which give a low vacuum reading are rejected.

In the aforesaid apparatus the vacuum or subatmospheric pressure source is applied in such manner that the entire interior of the container must be evacuated to a certain degree to give a proper "leakage" reading or impulse. This slows the operation of inspecting a container and also renders the leakage indication less sensitive by reason of the cushioning effect of the relatively large volume of the interior of the container.

Broadly speaking, the present apparatus provides a vacuum leakage arrangement of this general character wherein the interior of the container need not be evacuated and wherein the flow of atmospheric air to the vacuum line due to leakage incident to a defective finish flows directly into the vacuum line from either the exterior or the interior of the container.

The present invention further provides means whereby both the interior lip portion and the exterior lip portion of a container are simultaneously inspected for leakage instead of merely the flat top surface portion of the container finish as in the above prior application. The latter feature is particularly important in inspecting glass containers such as bottles for chipped finishes, particularly in the case of bottles which have been returned for refilling after having been used. The removal of conventional crown caps frequently results in chipped containers and unless such containers are eliminated before attempted re-use, substantial loss and inefficiency is encountered.

Speaking generally, the present invention provides a generally inverted cup-shaped member having an internal frusto-conical surface adapted to fit over the finish or lip portion of a glass bottle or jar and an internal plug-like member fixed with respect to the cup-shaped member and having an external frusto-conical surface adapted to fit and seat within the finish portion of the container. Vacuum is applied to the interior of the inverted cup-shaped member and the interior of the bottle or jar is freely vented to atmosphere by means of a bore extending downwardly through the plug member. Accordingly, leakage between the upper end of the bottle or jar and either the internal frusto-conical surface of the cup-shaped member or the external frusto-conical surface of the plug member, permits atmospheric air to flow into the interior of the cup-shaped member either from the ambient atmosphere or from the interior of the bottle which is likewise at atmospheric pressure.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

The single figure of the drawing is a vertical cross-sectional view of one form of the vacuum connector device of the present invention applied to the mouth of a glass bottle, together with a block diagram of the apparatus for producing a useful signal or operating impulse based upon variations in air flow due to leakage at the mouth of the bottle.

In the drawing, the numeral 10 designates the upper end of a glass bottle and the form of fluid pressure applicator shown herein by way of example comprises an inverted cup-shaped member 11, a tubular member 12 fixed axially therein and a plug 13 fixed to the lower end of tubular member 12. The lower end or rim of cup-shaped member 11 is internally tapered as at 14 and the periphery of plug 13 is frusto-conical as indicated at 15.

In the case of a bottle or other container having a substantially perfectly formed mouth or finish the opposed frusto-conical surfaces 14 and 15 will seat substantially hermetically against external and internal portions of the upper end or finish of the bottle. Tubular member 12 vents the interior of the bottle to atmosphere and the interior of cup-shaped member 11 has a vacuum or subatmospheric pressure connection 16. When the cup-shaped member 11 and plug 13 are applied to a bottle, as shown in the drawing, and sub-atmospheric pressure is applied to connection 16, the interior of cup-shaped member 11 is evacuated and if there is no leakage past the aforesaid internal and external sealing surfaces, a given vacuum pressure will be recorded.

If either the internal or external finish of the bottle is defective, either by reason of non-circularity or by reason of having been chipped, atmospheric air would flow into the space in cup-shaped member 11, either from the interior of bottle 10 or from the ambient air and this will reduce the vacuum or sub-atmospheric pressure gradient within member 11 and produce a different fluid pressure reading than in the case of a properly formed bottle or jar.

It will be noted that the application of vacuum or sub-atmospheric pressure by way of connection 16 is relatively quick and economical in producing the desired result since only the interior of cup-shaped member 11 must be brought to the proper sub-atmospheric pressure condition. In the apparatus and method of my prior application, Ser. No. 533,521, for instance, the entire interior of the container must be brought to the proper pressure level to produce a proper pressure gradient reading. Thus the interior of the bottle serves as a surge chamber which not only delays action of the apparatus but tends to cushion the operation and thus militate against producing a quick, accurate indication of a leakage condition and the degree of such condition.

Similar principles apply where the pressure application by way of connection 16 is super-atmospheric, in which case leakage air flows from the interior of member 11 either into the bottle and out through tubular member 12 or directly to the ambient air, depending on whether the leakage is at the external surface 15 of plug 13 or the internal surface 14 of member 11.

The means for converting the aforesaid leakage or flow to a useful inspection reading or impulse may be the same as in my aforesaid application, Ser. No. 533,521, or as illustrated in the drawing herein, may employ a balanced type of fluid flow detector such as is illustrated and described in detail in my copending application, Ser. No. 579,998, filed Sept. 16, 1966.

In the present drawings the numeral 20 designates a bridge type fluid flow detector which may be the same as that designated 13 in application, Ser. No. 579,998 and the application of vacuum or sub-atmospheric pressure to connection 16 through the flow detector 20 may be from a vacuum source 21 through a solenoid valve 22 and an air filter 23. The solenoid valve is opened only when an actual inspection operation is taking place, preferably after the member 11 and plug 13 have been applied to a bottle, as illustrated. The inspection head 11, 13 may be vertically movable to engage successive bottles passing along a conveyor or the head 11, 13 may be relatively stationary and bottles may be moved upwardly into sealing engagement therewith.

Likewise, as in the aforesaid application Ser. No. 579,998, variations in the fluid pressure gradient within cup-shaped member 11 due to leakage at the inner or outer surfaces of the finish of the bottle are applied to a fluid pressure transducer 24 which produces an electrical impulse proportionate to such fluid pressure variation. This electrical impulse may be amplified as indicated at 25 and employed to operate a mechanism 26 for rejecting bad bottles or other containers. If desired, the transducer 24 may be adjusted so that impulses are produced only when a bottle passes inspection, rather than the reverse, in which case the reject mechanism 26 will be replaced by means for passing all bottles which produce the desired "good bottle" signal.

In the case of beverage bottles which have been returned to the bottling plant for refilling the leak detection aforesaid by the internal surface 14 is particularly important since beverage bottles are frequently externally chipped, either in removing the usual crown cap or for other reasons prior to their return for refilling.

I claim:

1. Inspection apparatus for detecting surface defects in the finish portions of open-mouth glass containers comprising means for engagement against the mouth of a container, said means including an annular member having an internal annular surface portion for engagement against an outer portion of the container mouth and a plug member having an external annular surface portion spaced radially inwardly of said internal annular surface for engagement against an inner portion of the container mouth, said annular member and said plug member forming a chamber which includes the radial space between said annular member and said plug member, means for applying differential fluid pressure to said chamber whereby fluid leakage between either of said annular surface portions and the abutting container mouth portion due to irregularities in the latter is reflected in the degree of differential fluid pressure in said radial space, and pressure transducer means for producing readout signals in response to variations in said degree of differential fluid pressure, said plug member having a vent passage therethrough for venting the interior of said container to atmosphere.

2. Apparatus according to claim 1 wherein said differential fluid pressure is sub-atmospheric.

3. Apparatus according to claim 1 wherein said internal and external annular surface portions engage said container mouth obliquely.

References Cited

UNITED STATES PATENTS

| 2,880,610 | 4/1959 | McCoy | 73—49.2 |
| 3,039,294 | 6/1962 | Inman | 73—49.2 XR |
| 3,247,707 | 4/1966 | Tatro | 73—49.2 |

S. CLEMENT SWISHER, *Acting Primary Examiner.*

LOUIS R. PRINCE, *Examiner.*

J. NOLTON, *Assistant Examiner.*